(12) United States Patent
Krummrich (10) Patent No.: US 8,582,932 B2
(45) Date of Patent: Nov. 12, 2013

(54) METHOD AND DEVICE FOR TRANSMISSION OF OPTICAL DATA BETWEEN TRANSMITTER STATION AND RECEIVER STATION VIA OF A MULTI-MODE LIGHT WAVE GUIDE

(75) Inventor: Peter Krummrich, Dortmund (DE)

(73) Assignee: Technische Universitaet Dortmund, Dortmund (DE)

( * ) Notice: Subject to any disclaimer, the term of this patent is extended or adjusted under 35 U.S.C. 154(b) by 81 days.

(21) Appl. No.: 13/377,744

(22) PCT Filed: Jun. 14, 2010

(86) PCT No.: PCT/DE2010/000677
§ 371 (c)(1),
(2), (4) Date: Jan. 26, 2012

(87) PCT Pub. No.: WO2010/142285
PCT Pub. Date: Dec. 16, 2010

(65) Prior Publication Data
US 2012/0121220 A1 May 17, 2012

(30) Foreign Application Priority Data

Jun. 13, 2009 (DE) .................... 10 2009 025 232

(51) Int. Cl.
*H04B 10/12* (2011.01)
*G02B 6/26* (2006.01)

(52) U.S. Cl.
USPC ............................................. 385/28; 398/143

(58) Field of Classification Search
USPC ................................ 385/24, 28; 398/140–143
See application file for complete search history.

(56) References Cited

U.S. PATENT DOCUMENTS

| 4,955,014 A | 9/1990 | Kuppers et al. |
| 5,050,952 A | 9/1991 | Fussgäger |

(Continued)

FOREIGN PATENT DOCUMENTS

| EP | 0 265 918 | 5/1988 |
| EP | 0 390 002 | 10/1990 |
| FR | 2955003 A1 * | 7/2011 |

OTHER PUBLICATIONS

Saeed Bagheri et al: "Silicon-on-Insulator Mode-Selective Add-Drop Unit for On-Chip Mode-Division Multiplexing", Group IV Photonics, 2009. GFP '09. 6$^{th}$ IEEE International Conference On, IEEE, Piscataway, NJ, USA, Sep. 9, 2009, pp. 166-168, XP031569958, ISBN: 978-1-4244-4402-1. (ISR).

(Continued)

*Primary Examiner* — Daniel Petkovsek
(74) *Attorney, Agent, or Firm* — Collard & Roe, P.C.

(57) ABSTRACT

A method for transmitting optical information between an emitter station and a receiving station via a multi-mode optical wave guide uses a wave length multiplex method. Several optical emitters generate a respective signal for each wave length to be transmitted. The signals are fed to the multi-mode optical wave guide in the form of a number of modes via mode multiplexers and wavelength multiplexers, the multi-mode optical wave guide having its own mode that can propagate within the multi-mode optical wave guide for each mode to be transmitted. After transmission and optionally regeneration and/or amplification of the signal via the multi-mode optical wave guide, the transmitted signals are broken down via the wavelength multiplexer into groups of signals having the same wavelength and via the mode demultiplexer into signals having the same mode. Subsequently, the interference signals are extracted from the transmitted demultiplexed signals.

43 Claims, 4 Drawing Sheets

(56) References Cited

U.S. PATENT DOCUMENTS

| | | | |
|---|---|---|---|
| 6,151,144 A * | 11/2000 | Knox | 398/79 |
| 6,607,311 B1 * | 8/2003 | Fishman et al. | 398/79 |
| 7,565,084 B1 * | 7/2009 | Wach | 398/201 |
| 2007/0280695 A1 | 12/2007 | Li et al. | |

OTHER PUBLICATIONS

A.M.J. Koonen et al: "Advanced Technologies for Service-Integrated Optical In-Building Networks", Transparent Optical Networks, 2007. ICTON '07. 9th International Conference On, IEEE, PI, Jul. 1, 2007, pp. 122-125, XP031130464, ISBN: 978-1-4244-1248-8. (ISR).

Ronald Freund: "High-speed Transmission in Multimode Fibers", Optical Fiber Communication—Includes Post Deadline Papers, 2009. OFC 2009. Conference On, IEEE, Piscataway, NJ, USA, Mar. 22, 2009, pp. 1-63, XP031467719, ISBN: 978-1-4244-2606-5. (ISR).

International Search Report of PCT/DE2010/000677, Jan. 7, 2011.

International Preliminary Report on Patentability and Written Opinion of the International Searching Authority of PCT/DE2010/000677, Dec. 29, 2011.

* cited by examiner

Fig. 1

Prior Art

METHOD AND DEVICE FOR TRANSMISSION OF OPTICAL DATA BETWEEN TRANSMITTER STATION AND RECEIVER STATION VIA OF A MULTI-MODE LIGHT WAVE GUIDE

CROSS REFERENCE TO RELATED APPLICATIONS

This application is the National Stage of PCT/DE2010/000677 filed on Jun. 14, 2010, which claims priority under 35 U.S.C. §119 of German Application No. 10 2009 025 232.0 filed on Jun. 13, 2009. The international application under PCT article 21(2) was not published in English.

The invention relates to a method and a device for transmission of optical data between transmitter station and receiver station by way of a multi-mode light waveguide, in accordance with the preamble of claim 1, and to a device suitable for implementing the method, in accordance with the preamble of claim 21.

The infrastructure for the most varied purposes of data transmission have been constantly developed further in recent years. In this connection, the demands with regard to increasing the bandwidth in data transmission have significantly determined the technical further development of transmission techniques. Both transmission by means of electrical signals in copper cable networks and transmission by means of optical signals in light waveguide networks have made great advances in this connection. However, the increases in the bandwidth additionally made available in this manner have constantly been offset by the greater amounts of data to be transmitted with them.

Optical transmission systems using wavelength multiplex operation currently offer the only approach for transmission of data streams at a total data rate of several terabits per second, over distances of several hundred kilometers, in a single transmission medium. Systems commercially available today work at a capacity of up to 3.2 Tbit/s per glass fiber. The capacity demand is currently increasing at approximately 50% to 100% per year.

With this approach, the maximal capacity that can be reached with reasonable effort can still be increased approximately by a factor of 20 by means of the use of additional wavelength bands and an increase in bandwidth efficiency. If the capacity demand continues to grow in the future, as well, at a conservative estimate of 50% per year, new solutions will be needed in eight years to satisfy the demand; at a growth of 100% per year, this will already happen in five years.

Therefore, a possibility is being sought that allows an increase in transmission capacity far beyond a factor of 20.

The first fiber-optic transmission systems worked with a single wavelength or one optical carrier, and achieved a capacity of 34 Mbit/s. The data signal was imposed on the carrier using two-step intensity modulation—turning the transmitter on for a "1" bit and turning it off for a "0" bit. An increase in the transmission capacity from generation to generation took place by means of shortening the symbol duration, allowing the transmission of more bits per time unit. This time multiplex operation offers a possible approach for increasing the bit rate. Transmission systems commercially available today achieve channel data rates of up to 40 Gbit/s, by means of electrical time multiplex operation. In the laboratory, channel data rates of slightly above 1 Tbit/s were demonstrated using optical time multiplex operation.

Figure 1:
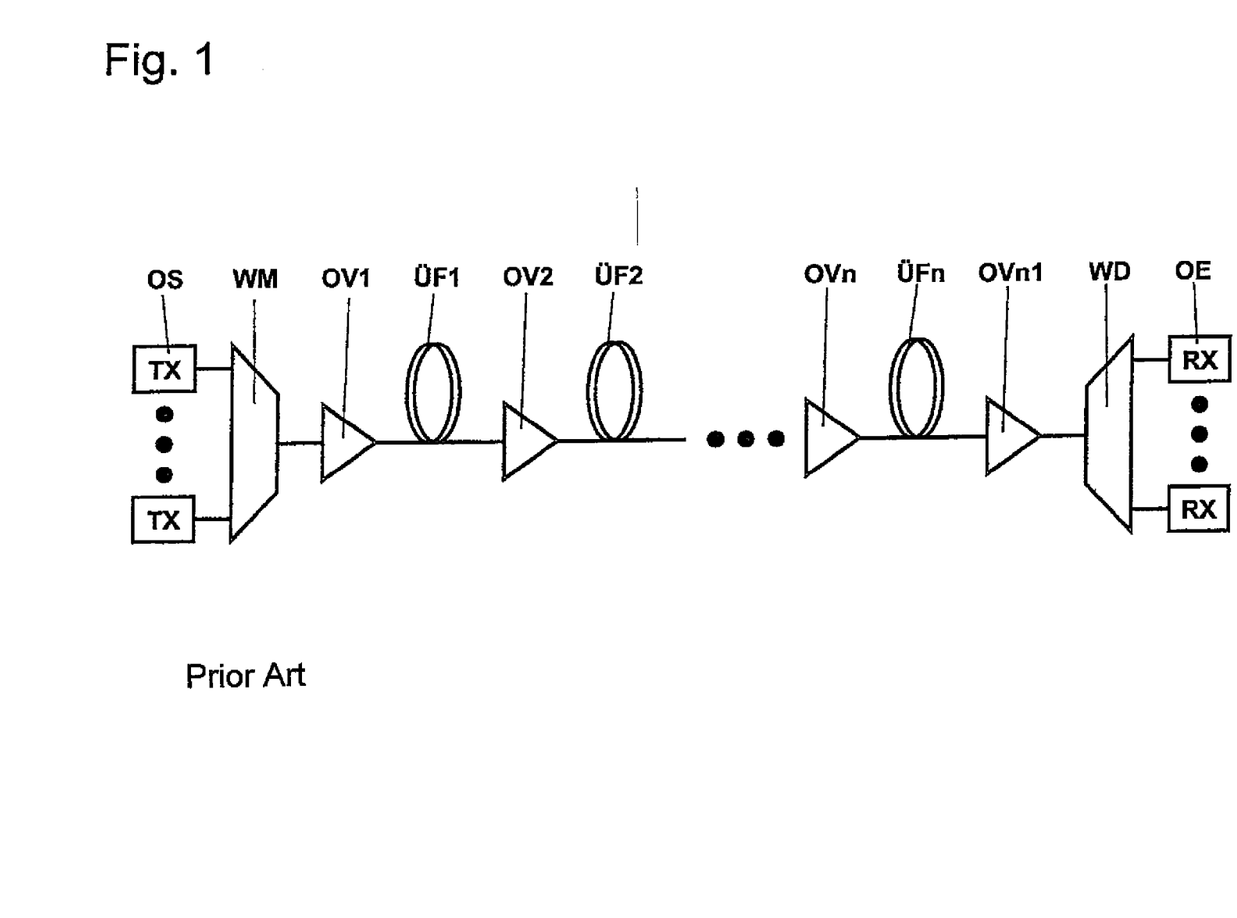
FIG. 1—fundamental structure of a wavelength multiplex transmission system according to the state of the art, FIG. 2—fundamental structure of a device according to the invention, having a wavelength multiplex transmission system that additionally uses mode multiplex operation, FIG. 3—possible embodiment of a mode multiplexer, FIG. 4—possible embodiment of a mode demultiplexer, FIG. 5—possible embodiment of a mode demultiplexer having a local oscillator, FIG. 6—possible embodiment of a mode demultiplexer in a waveguide embodiment.

A further increase in transmission capacity per fiber can be brought about by means of so-called wavelength multiplex operation (WDM—Wavelength Division Multiplexing), i.e. the transmission of multiple channels in a fiber at different wavelengths (see FIG. 1). Multiple optical transmitters OS generate signals TX at different wavelengths. These are combined using a wavelength multiplexer WM, and can subsequently be amplified together in optical amplifiers $OV_1 \ldots OV_{n1}$ and transmitted together in transmission fiber segments $ÜF_1 \ldots ÜF_n$. At the end of the transmission segment, a wavelength demultiplexer WD separates the transmitted signals TX once again, and passes them to individual receivers OE as reception signals RX. Systems commercially available today transmit up to 80 channels using the WDM technique, resulting in a total capacity of 3.2 Tbit/s at a channel data rate of 40 Gbit/s. The 80-channel systems work at a channel interval of 50 GHz. This corresponds to a bandwidth efficiency of 0.8 Bit/s/Hz at a channel data rate of 40 Gbit/s.

Polarization multiplex operation, i.e. transmission of two independent signals in the two orthogonal polarizations of the single-mode fibers used in wide-area network technology, offers a further approach for increasing bandwidth efficiency. Using this method, it is possible to double the transmission capacity at the same channel data rate and number of wavelengths.

Multi-step modulation methods allow a further increase in bandwidth efficiency. These transmit not just one bit per time unit or symbol like two-step or binary intensity modulation, but rather several. Differential quaternary phase modulation (DQPSK—Differential Quaternary Phase Shift Keying) allows doubling the bit rate in comparison with binary methods, as a four-step method, by means of transmission of two bits per symbol, at the same symbol rate. A further increase in the bits transmitted per symbol yields even greater bandwidth efficiency, at the same channel interval and the same symbol rate. For example, the eight-step differential phase modulation method D8PSK allows transmission of 3 bits per symbol. However, the constantly decreasing symbol interval of the higher-step methods leads to demands on the optical signal-to-noise ratio, which demands can hardly be met for the desired ranges. Furthermore, the higher-step methods suffer disproportionately greatly under the influence of non-linear effects in the transmission fiber, thereby additionally restricting the range. The use of four-step modulation methods in combination with polarization multiplex operation appears halfway feasible in wide-area network technology. At the same symbol rate and channel interval, it would be possible to increase the bandwidth efficiency by a factor of 4, to 3.2 bit/s/Hz, in this way, in comparison with the two-step modulation methods without polarization multiplex operation that are in use today. Transmission of additional channels also allows an increase in the transmission capacity. For this purpose, new wavelength bands have to be put into operation, or the C band currently in use has to be expanded. Because of the increase in spectral attenuation at the edges of the band that is in use today, the range decreases with transmission methods that are otherwise the same. Up to approximately five times the channel number in use today, this increase in attenuation could be equalized by means of known methods, or tolerated. In combination with the increase in bandwidth efficiency, the increase in the number of channels allows an increase in the transmission capacity per fiber approximately by a factor of 20. This factor can only be achieved, however, with significant technical effort. Installation of a second transmission system with its own fiber also allows doubling the transmission capacity per cable. However, this spatial multiplex approach is eliminated for cost reasons.

Thus, from the current point of view, no approaches are known that allow a cost-efficient increase in the transmission capacity, clearly beyond a factor of 20, in wide-area network technology.

It is therefore the task of the present invention to indicate a method and a device with which the transmission capacity of optical wavelength multiplex transmission systems can be increased per light waveguide.

The solution for the task according to the invention is evident, with regard to the method, from the characterizing features of claim 1, and, with regard to the device, from the characterizing features of claim 21, in interaction with the characteristics of the related preamble. Further advantageous embodiments of the invention are evident from the dependent claims.

The invention proceeds from a method for transmission of optical data between a transmitter station and a receiver station, by way of a multi-mode light waveguide, using a wavelength multiplex method. Light waveguide should be understood to mean any type of fibers or strips that conduct light waves, which can be used in optical transmission technology. Such a method of the stated type is developed further in that multiple optical transmitters generate a signal, in each instance, for each of the wavelengths to be transmitted, and these signals are applied, in the form of a plurality of modes, to the multi-mode light waveguide, by way of mode multiplexer(s) and wavelength multiplexer(s), whereby the multi-mode light waveguide has a separate mode capable of propagation within the light waveguide for each of the modes to be transmitted, after transmission and, if applicable, regeneration and/or amplification of the signal by way of the multi-mode light waveguide, the transmitted signals are split up into groups of signals having the same wavelength, by way of wavelength demultiplexer(s), and into signals having the same mode, by way of mode demultiplexer(s), and subsequently, the interference signals that resulted from over-coupling between the individual modes during transmission by way of the multi-mode light waveguide are removed from the transmitted demultiplexed signals. The method according to the invention uses mode multiplex operation to transmit additional channels in a waveguide. Previous wavelength multiplex systems work with single-mode waveguides. These carry only a single mode, but carry this mode in two polarizations that are orthogonal to one another, and this is utilized by polarization multiplex operation. The number of modes carried can be increased in a step waveguide by means of increasing the core diameter and/or increasing the index jump at the core/mantle boundary of the waveguide. In the case of other index of refraction profiles, as well, the number of carried modes increases with an increasing fiber parameter V. Multi-mode waveguides are already in use for short-distance connections. In this application case, a signal is transmitted jointly in all the modes capable of propagation. In contrast, the method according to the invention, with the inclusion of mode multiplex operation, makes use of each mode capable of propagation for transmission of a separate signal or channel. In this connection, targeted excitation of each individual mode of a multi-mode light waveguide takes place by means of a separate signal, in each instance; joint transmission of the signals takes place using the mode multiplex technique, and subsequent separation of the signals takes place along with triggering of interference signals that are caused by mode coupling. The advantage of the invention consists in that the transmission capacity can clearly be increased, in cost-advantageous manner, for a desired range, using mode multiplex operation, if necessary together with other known methods, beyond the capacity that can be achieved solely by means of a combination of time multiplex operation, wavelength multiplex operation, polarization multiplex operation, or multi-step modulation methods.

With regard to the sequence of multiplexing of the signals on the transmitter side and of demultiplexing of the received signals on the receiver side, different configurations can be used:

In a first embodiment, the signals for each of the wavelengths to be transmitted can first be applied to a number of mode multiplexers and subsequently to a common wavelength multiplexer. In this connection, the signals are typically passed to the mode multiplexers, for multiplexing in the mode multiplexers, in the basic mode of a single-mode fiber, in each instance whereby a transformation of the field distributions, for example, takes place in the mode multiplexers, during which each incoming signal excites a mode, in each instance, of the multi-mode light waveguide disposed on the output side of the mode multiplexers. A prerequisite for this is that at least as many modes are capable of propagation in the multi-mode light waveguides between mode multiplexers and wavelength multiplexers as the signals that are supposed to be transmitted between mode multiplexers and wavelength multiplexers. Subsequently, all the signal groups are combined in the wavelength multiplexer, at the different wavelengths, in a single multi-mode light waveguide, for transmission to the receiver station, and are fed into the multi-mode light waveguide intended for the long-distance transmission, and typically transmitted over a greater distance with repeated amplification and regeneration of the signals.

In another embodiment, however, it is also possible that during multiplexing, the signals for each of the wavelengths to be transmitted are first applied to a number of wavelength multiplexers and subsequently to a common mode multiplexer. In this connection, the signals are passed to the wavelength multiplexers, for multiplexing in the wavelength multiplexers, in a basic mode of a single-mode light waveguide, in each instance, and excitation of the modes of a multi-mode light waveguide takes place in the mode multiplexer that follows the wavelength multiplexers, by means of the wavelength groups generated by the wavelength multiplexers, in each instance.

Analogously, during demultiplexing on the receiver side, the transmitted signals can also be applied first to a wavelength demultiplexer and subsequently to a number of mode demultiplexers. In this connection, the wavelength demultiplexer separates the channel groups at the individual wavelengths, and passes a group of channels having the same wavelength, in each instance, by way of multi-mode light waveguides, to the mode demultiplexers in which separation of the signals into the individual modes then takes place. Alternatively, here, again, the sequence of demultiplexing of mode and wavelength can be changed in that during demultiplexing, the transmitted signals are first applied to a mode demultiplexer and subsequently to a number of wavelength demultiplexers, whereby separation of the signal groups takes place in the mode demultiplexer, in the individual modes, and the wavelength demultiplexers separate the signals at the individual wavelengths.

It is furthermore important that in the transmission of the signals between transmitter station and receiver station, by way of the multi-mode light waveguide, the optical amplification and transmission of the signals takes place in the multi-mode technique, by way of the multi-mode light waveguide between transmitter and receiver, so that all the data concerning wavelength and mode contained in the signals fed in are completely received and transmitted to the receiver station.

It is furthermore advantageous if a step light waveguide is used in the method, in which waveguide the multi-mode light waveguide has an increased number of carried modes, by means of increasing the core diameter and/or raising the index jump at the core/mantle boundary. Alternatively, it is also possible that the multi-mode light waveguide has an increased number of carried modes as the result of increasing the fiber parameter V, in the case of index of refraction profiles having different shapes. In this way, the number of modes available for transmission of data can be adapted in accordance with the transmission requirement or the required bandwidth.

The invention furthermore relates to a device for transmission of optical data between a transmitter station and a receiver station, by way of a multi-mode light waveguide, using a wavelength multiplex method, particularly for implementation of the method according to claim 1. Such a device has a transmitter station having multiple optical transmitters for each of the wavelengths to be transmitted, which transmitters each produce a signal and apply these signals to the multi-mode light waveguide by way of mode multiplexers and wavelength multiplexers, whereby the multi-mode light waveguide has a separate mode capable of propagation within the multi-mode light waveguide for each of the modes to be transmitted. Furthermore the device has a receiver station having multiple optical receivers that split the transmitted signals up into groups of signals having the same wavelength, by way of wavelength demultiplexers, and into signals having the same mode, by way of mode demultiplexers.

In the case of the device, as well, as for the method described above, it is possible that different arrangements of mode multiplexers and wavelength multiplexers, or of mode demultiplexers and wavelength demultiplexers, are used for multiplexing and demultiplexing of the data.

In this connection, in a first embodiment, the transmitter station can have a mode multiplexer, in each instance, for multiplexing the signals for each of the wavelengths or wavelength channels to be transmitted, and a common wavelength multiplexer that processes the output signals of the mode multiplexers. Alternatively, the sequence of mode multiplexer(s) and wavelength multiplexer(s) can also be interchanged, so that the transmitter station has a wavelength multiplexer for multiplexing the signals for each of the wavelengths or wavelength channels, in each instance, and a common mode multiplexer that processes the output signals of the wavelength multiplexers.

The same holds true analogously for the receiver station, as well, in which a common wavelength demultiplexer can be used for demultiplexing the signals for all the transmitted wavelengths or wavelength channels, and a number of mode demultiplexers can be used that process the output signals of the wavelength demultiplexer. Alternatively, here, as well, the sequence of mode demultiplexer(s) and wavelength demultiplexer(s) can be interchanged, in that the receiver station has a common mode demultiplexer for demultiplexing the signals for all the transmitted wavelengths or wavelength channels, and a number of wavelength demultiplexers that process the output signals of the mode demultiplexer.

With regard to the configuration of a mode multiplexer, it is possible that the mode multiplexer has a number of gradient lenses $GL_{ein}$ on the input side that corresponds to the number of signal channels to be transmitted, which lenses convert the field distribution of the signals in the basic mode of single-mode light waveguides into parallel beams, and that mode converters MK follow the gradient lenses $GL_{ein}$, which convert the field distribution of the signals in such a manner that each signal, after they are brought together in semi-transparent mirrors TS and focused using a subsequent gradient lens $GL_{aus}$, excites precisely one mode, in each instance, of the multi-mode light waveguide disposed on the output side of the mode multiplexer. In this connection, holograms or suitable spatial filters can be present in the mode converters MK, with which transformation of the field distribution takes place.

With regard to the configuration of a mode demultiplexer, it is possible that the mode demultiplexer has a gradient lens $GL_{ein}$ on the input side, which transforms the output signal of the multi-mode light waveguide into a parallel beam, that semi-transparent mirrors TS follow the gradient lens $GL_{ein}$, which multiply the parallel beam and pass it to mode converters MK that undertake transformation of the field distribution of the desired mode, in each instance, into a field distribution that excites the basic mode of the single-mode light waveguide on the output side after focusing in a subsequent gradient lens $GL_{aus}$. In this connection, it is advantageous if the mode converters MK are configured in such a manner that they maintain the orthogonality of the field distribution. In this way, the result can be achieved that the mode demultiplexer couples each mode of the multi-mode light waveguide on the input side into precisely one single-mode light waveguide on the output side, in each instance. Furthermore, the mode demultiplexer can be followed by a cross-mode interference canceller XMIC, which undertakes separation of the interference components that occurred along the transmission segment, by means of mode coupling. This cross-mode interference canceller XMIC can uncouple part of the signal per input, multiply it by a coefficient that influences the amount and the phase of the signal, and pass it to another output.

Alternatively, it is also possible that an electrical module follows the mode demultiplexer, which removes the interference components from the demultiplexed signals after conversion to the electrical plane, in that the output signals of the mode demultiplexer are coherently detected using superimposition receivers, and subsequently converted to digital signals. In this connection, means for digital signal processing can be provided in the electrical module, which means perform cancellation of the interference components in accordance with the principle of the cross-mode interference canceller.

As an alternative to the method of procedure for demultiplexing as described above, a waveguide arrangement for coherent detection can also be disposed in the receiver station, behind the output of the multi-mode light waveguide MM-LWL, having a coupling zone KZ, which arrangement makes a transition into a number of single-mode light waveguides SM-LWL. In this connection, the number of outgoing single-mode light waveguides SM-LWL is selected in such a manner that at least one single-mode light waveguide SM-LWL is provided per mode carried in the multi-mode light waveguide MM-LWL. In this connection, it is furthermore possible that in this embodiment, an electrical circuit is provided, which performs separation of the signals after coherent detection, preferably using a cross-mode interference canceller.

It is furthermore possible that a free-beam arrangement having lenses or other imaging elements such as curved mirrors or holograms is provided in the coupling zone KZ.

With regard to the configuration of the mode demultiplexer, the mode demultiplexer can furthermore perform superimposition of the signal of the local oscillator LO with the signal to be detected, for which purpose a gradient lens $GL_{LO}$, for example, is provided, which converts the output signal of the local oscillator LO into a parallel beam and brings it together with the signal to be detected in a semi-transparent mirror TS, whereby subsequently, coupling the two signals into a single-mode light waveguide takes place using a gradient lens $GL_{aus}$. For example, the gradient lens $GL_{LO}$ can be configured, in this connection, for producing phase diversity and/or polarization diversity. In this connection, the signal of the local oscillator LO can also be passed in perpendicular to the plane of the beam guidance of the other signals in the mode demultiplexer. It is also possible that the signal of the local oscillator LO is divided up using semi-transparent mirrors TS and passed to multiple gradient lenses GL.

A particularly preferred embodiment of the device according to the invention is shown in the drawing.

This shows.

Figure 2:
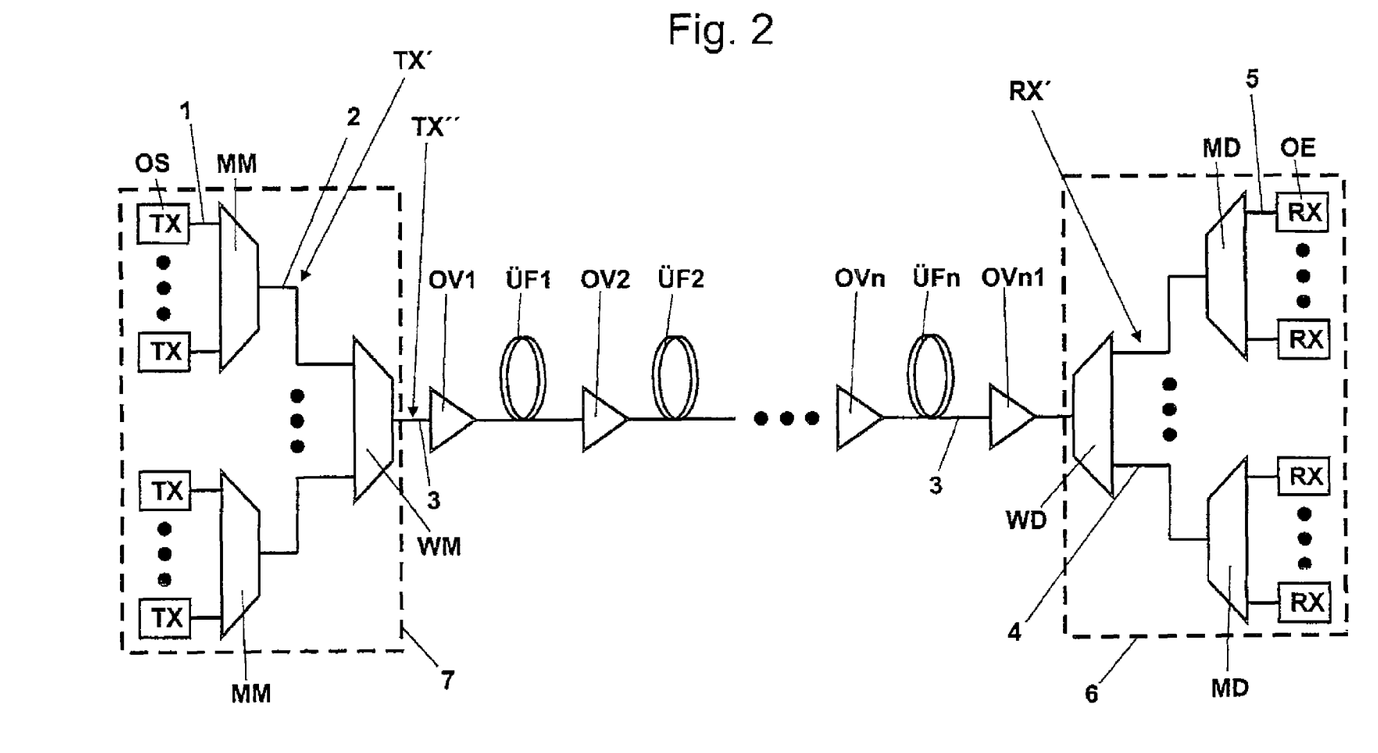

In FIG. 2, a fundamental structure of a device according to the invention, having a wavelength multiplex transmission system, is shown, which additionally uses mode multiplex operation.

In this connection, multiple optical transmitters OS each generate a signal TX. These signals TX, in the basic mode of a single-mode light waveguide 1, in each instance, are passed to a related mode multiplexer MM from among a number of the same mode multiplexers MM, which are responsible for different wavelength ranges of the signals TX. There, transformation of the field distributions takes place, in such a form that each incoming signal TX excites a mode, in each instance, of the multi-mode light waveguide 2 on the output side to a subsequent wavelength multiplexer WM. At least as many modes are capable of propagation in the multi-mode light waveguide 2 as the number of signals TX to be transmitted. The multi-mode light waveguide 2 passes the signals TX', which have been multiplexed together and whose carriers all have the same wavelength, to a wavelength multiplexer WM. There, the signals TX' that have been multiplexed together are brought together with the signal groups at the other wavelengths from the other mode multiplexers MM, to form a signal TX", in a single multi-mode light waveguide 3 that undertakes transmission over a longer transmission segment.

The subsequent optical amplification $OV_1, OV_2, \ldots OV_n$, $OV_{n1}$ by way of the transmission segments $\"UF_1, \"UF_2, \ldots \"UF_n$ takes place during transmission of the signals TX", also in multi-mode technology. At the end of the transmission segment of the multi-mode light waveguide 3, a wavelength demultiplexer WD first separates the channel groups at the individual wavelengths and passes a group of channels having the same wavelength, in each instance, in the multi-mode light waveguide 4, to a mode demultiplexer MD. There, separation of the signals RX into the individual modes takes place. Because over-coupling between modes can take place during transmission, the interference components must be removed. Afterwards, the individual signals RX are available for further processing, which is not shown further.

The sequence of the mode multiplexer MM and of the wavelength multiplexer WM or of the mode demultiplexer MD and of the wavelength demultiplexer WD can be interchanged. In a further embodiment, not shown, joining together of the wavelengths can therefore take place first, in single-mode technology, in the transmitter station 7, in a number of wavelength multiplexers WM, and only afterwards does excitation of modes of the multi-mode fiber 2 by means of the wavelength groups, in each instance, take place in a common mode multiplexer MM. In the receiver station 6, the signal groups are first separated into different modes in a single mode demultiplexer MD, and subsequently a number of wavelength demultiplexers WD separates the signals at the individual wavelengths. Alternatively, mode multiplexer(s) MM and wavelength multiplexer(s) WM can also be combined in a common unit; analogously, it is also possible to combine mode demultiplexer(s) MD and wavelength demultiplexer(s) WD in a common unit. Furthermore, mode multiplex operation can also be combined with polarization multiplex operation.

Figure 3:
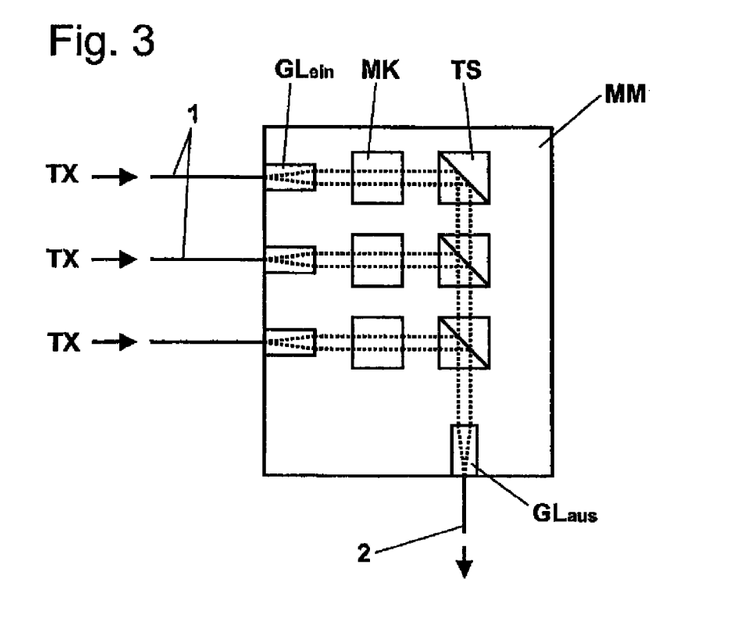

FIG. 3 shows a possible embodiment and the fundamental structure of a mode multiplexer MM. Delivery of the signals TX takes place by way of the single-mode light waveguide 1, in the basic mode of the single-mode light waveguide 1. A number of gradient lenses $Gl_{ein}$ corresponding to the number of signals TX convert the field distribution at the output of the single-mode light waveguide 1 into parallel beams. In the mode converters MK, which follow in a corresponding number, the field distributions of the signals are converted in such a manner that each signal TX excites precisely one mode of the multi-mode light waveguide 2 on the output side, in each instance, after having been combined in semi-transparent mirrors TS and focusing using the gradient lens $GL_{aus}$. Transformation of the field distribution in the mode converters MK can take place using holograms or suitable spatial filters, for example.

Figure 4:
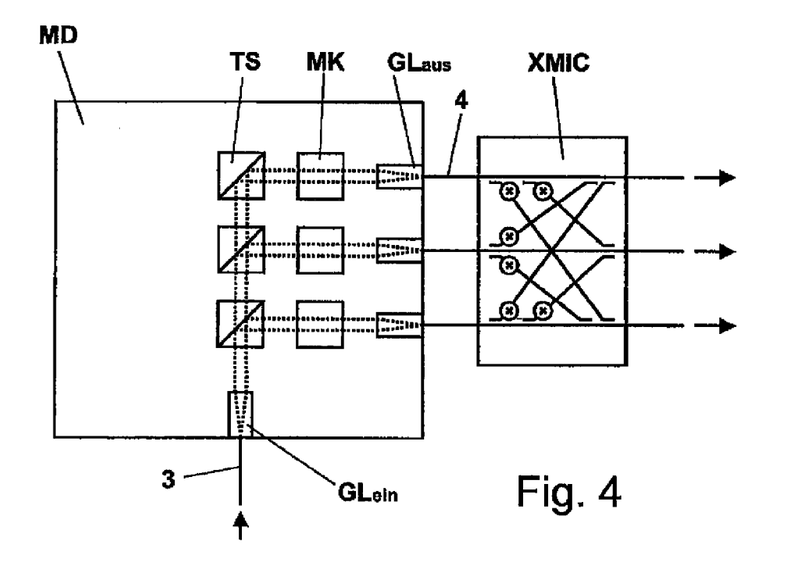

An example for the structure of a mode demultiplexer MD is shown in FIG. 4. A multi-mode light waveguide 3 delivers the mode group from the transmitter station 7 that is to be separated, at the bottom of the figure. The output signal of the multi-mode of the multi-mode light waveguide 3 is transformed into a parallel beam, using the gradient lens $Gl_{ein}$, multiplied in semi-transparent mirrors TS, and subsequently passed to mode converters MK. There, transformation of the field distribution of the desired mode into a field distribution that excites the basic mode of the single-mode light waveguide 4, after focusing in a related gradient lens $Gl_{aus}$ on the output side takes place, in each instance. If the mode converter MK maintains the orthogonality of the field distributions, the mode demultiplexer MD couples every mode of the multi-mode light waveguide 3 on the input side into precisely one single-mode light waveguide 4 on the output side, in each instance.

Subsequently, separation of the interference components that occurred along the transmission segment as the result of mode coupling takes place in the cross-mode interference canceller XMIC. This uncouples part of the signal per input, multiplies it by a coefficient that influences amount and phase of the signal, and passes it to a different output. By means of a suitable selection of the coefficients, which can also be dependent on wavelength, it is therefore possible to cancel out components of the other signals, per branch, which were added to the branch as the result of mode coupling along the transmission path in the multi-mode light waveguide 3.

Removal of the interference components can also take place after conversion to the electrical plane. For this purpose, the output signals of the mode demultiplexer MD are coherently detected using superimposition receivers, and subsequently converted to digital signals, in a manner not shown further. Cancellation of the interference components can then also take place according to the principle of the cross-mode interference canceller XMIC, but using digital signal processing.

Figure 5:
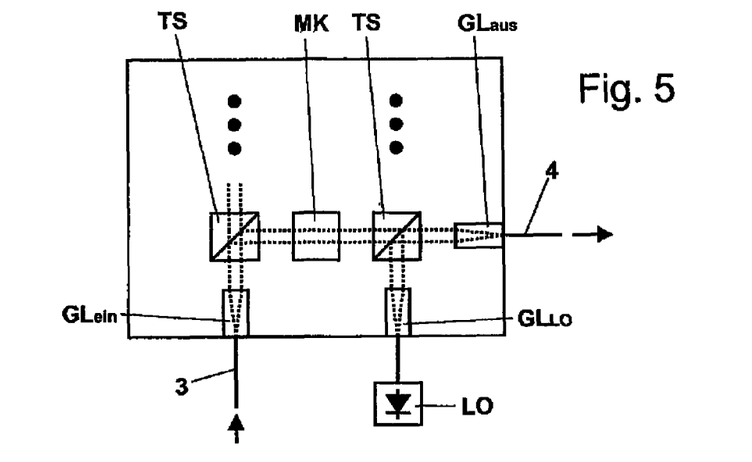

As shown in FIG. 5, the superimposition of the local oscillator signal on the signal to be detected, which is required for coherent detection, can also take place in the mode demultiplexer MD. For this purpose, the output signal of the local oscillator LO is converted into a parallel beam in a gradient lens $GL_{LO}$, and brought together with the signal to be detected, in a semi-transparent mirror TS'. Subsequently, the two signals are coupled into a single-mode light waveguide 4, using a gradient lens $GL_{aus}$. It is practical, in this connection, if the phase diversity not shown here and, if necessary, also polarization diversity is used. Furthermore, feed of the signal of the local oscillator LO can take place not as shown here, in one plane, but rather from above, in other words perpendicular to the plane of the drawing, from above. If the available output power of the local oscillator LO is sufficiently great, the signal of the local oscillator LO could be split up using semi-transparent mirrors TS', and passed to multiple gradient lenses $GL_{LO}$. In this way, fewer local oscillator signal sources than the number of output signals that are to be detected are required.

Figure 6:
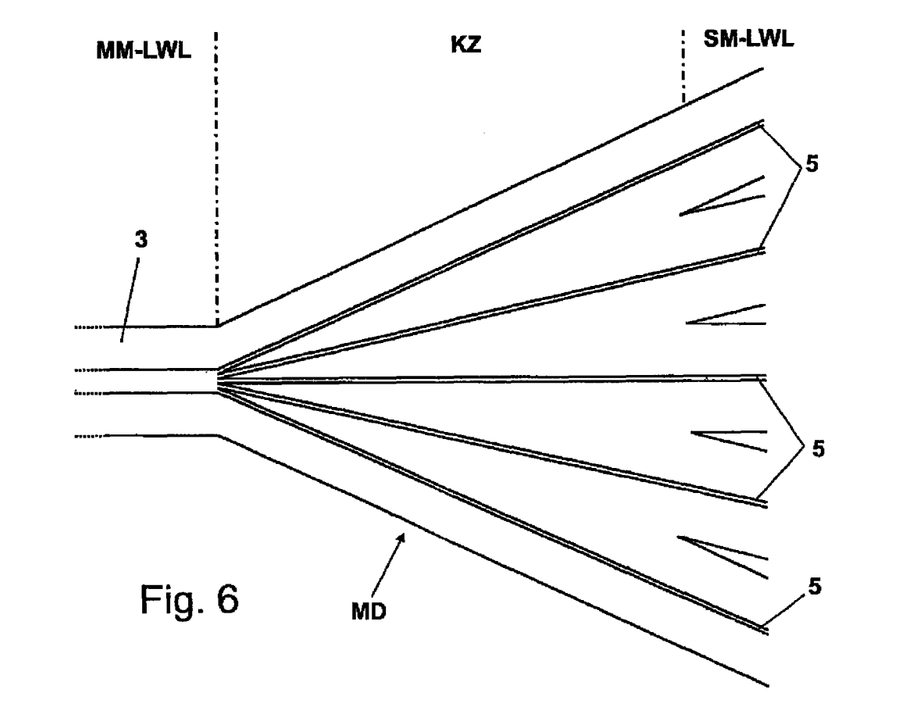

Because separation of the signals can take place in the electrical plane in the approach using coherent detection or superimposition reception, an arrangement as shown in FIG. 6 is suitable as a mode demultiplexer MD. A coupling zone KZ follows the output MM-LWL of the multi-mode light waveguide 3, from left to right. This zone finally makes a transition into a number of single-mode light waveguides 5 in a region SM-LWL. In this connection, the number of outgoing single-mode light waveguides 5 must be selected in such a manner that at least one single-mode light waveguide 5 is provided per mode carried in the multi-mode light waveguide 3.

In this arrangement, the field distribution belonging to a mode in the multi-mode light waveguide 3 generally excites the basic modes of multiple single-mode light waveguides 5. Analogously, separation of the signals must take place after coherent detection in the electrical plane. This can take place, for example, using a cross-mode interference canceller XMIC.

In place of the waveguide arrangement in the coupling zone KZ, a free-beam arrangement with lenses or other imaging elements such as curved mirrors or holograms can also be used.

If applicable, such an arrangement is also suitable as a mode multiplexer MM for exciting the modes in the multi-mode light waveguide 3 on the transmitter side.

The mode multiplex method is suitable not only for transmission based on glass fibers, but also for other waveguide types such as, for example, planar waveguides 3, if they are capable of propagation in multiple orthogonal modes.

Furthermore, transmission can also take place in purely passive manner, i.e. without optical amplification of the transmitted mode multiplex signal.

The invention claimed is:

1. Method for transmission of optical data between a transmitter station (7) and a receiver station (6), by way of a multi-mode light waveguide (3), using a wavelength multiplex method,
wherein
multiple optical transmitters (OS) generate a signal (TX), in each instance, for each of the wavelengths to be transmitted, and these signals (TX) are applied, in the form of a plurality of modes, to the multi-mode light waveguide (3), by way of mode multiplexer(s) (MM) and wavelength multiplexer(s) (WM), wherein the multi-mode light waveguide (3) has a separate mode capable of propagation within the multi-mode light waveguide (3) for each of the modes to be transmitted, after transmission and, if applicable, regeneration and/or amplification of the signal by way of the multi-mode light waveguide (3), the transmitted signals are split up into groups of signals having the same wavelength, by way of wavelength demultiplexer(s) (WD), and into signals having the same mode, by way of mode demultiplexer(s) (MD), the interference signals that resulted from over-coupling between the individual modes during transmission by way of the multi-mode light waveguide (3) are removed from the transmitted demultiplexed signals (RX).

2. Method according to claim 1, wherein during multiplexing, the signals (TX) for each of the wavelengths to be transmitted are first applied to a number of mode multiplexers (MM) and subsequently to a common wavelength multiplexer (WM).

3. Method according to claim 2, wherein the signals (TX) are passed to the mode multiplexers (MM) in the basic mode of a single-mode light waveguide (1) or in the form of a free beam, in each instance, for multiplexing in the mode multiplexers (MM).

4. Method according to claim 3, wherein transformation of the field distributions takes place in the mode multiplexers (MM), during which each incoming signal (TX) excites a mode of the multi-mode light waveguide (3) disposed on the output side of the mode multiplexer (MM), in each instance.

5. Method according to claim 3, wherein at least as many modes are capable of propagation in the multi-mode light waveguides (3), between mode multiplexers (MM) and wavelength multiplexer (WM), as the number of signals (TX) to be transmitted between mode multiplexers (MM) and wavelength multiplexer (WM).

6. Method according to claim 5, wherein the multi-mode light waveguide (3) transmits the signals that have been multiplexed together and that all have the same wavelength, between mode multiplexers (MM) and wavelength multiplexer (WM).

7. Method according to claim 2, wherein all the signal groups at the different wavelengths are brought together in the wavelength multiplexer (WM), in a single multi-mode light waveguide (3), for transmission to the receiver station (6).

8. Method according to claim 1, wherein during multiplexing, the signals (TX) for each of the wavelengths to be transmitted are first applied to a wavelength multiplexer (WM) and subsequently to a common mode multiplexer (MM).

9. Method according to claim 8, wherein the signals (TX) are passed to the wavelength multiplexers in the basic mode of a single-mode light waveguide (1) or in the form of a free beam, in each instance, for multiplexing in the wavelength multiplexers (WM).

10. Method according to claim 9, wherein excitation of the modes of a multi-mode light waveguide (3) by the wavelength groups generated by the wavelength multiplexers (WM), in each instance, takes place in the mode multiplexer (MM) that follows the wavelength multiplexers (WM).

11. Method according to claim 1, wherein during demultiplexing, the transmitted signals are first applied to a wavelength demultiplexer (WD) and subsequently to a number of mode demultiplexers (MD).

12. Method according to claim 11, wherein the wavelength demultiplexer (WD) separates the channel groups at the individual wavelengths, and passes a group of channels having the same wavelength, in each instance, to the mode demultiplexers (MD) by way of multi-mode light waveguides (4).

13. Method according to claim 11, wherein separation of the signals into the individual modes takes place in the mode demultiplexers (MD).

14. Method according to claim 1, wherein during demultiplexing, the transmitted signals are first applied to a mode demultiplexer (MD) and subsequently to a number of wavelength demultiplexers (WD).

15. Method according to claim 14, wherein separation of the signal groups into the individual modes takes place in the mode demultiplexer (MD).

16. Method according to claim 14, wherein the wavelength demultiplexers (WD) separate the signals at the individual wavelengths.

17. Method according to claim 1, wherein optical amplification and transmission of the signals takes place in multi-mode technology, by way of the multi-mode light waveguide (3), between transmitter station (7) and receiver station (6).

18. Method according to claim 1, wherein the multi-mode light waveguide (3) has an increased number of carried modes in a step light waveguide (3), by means of an increase in the core diameter and/or an increase in the index jump at the core/mantle boundary.

19. Method according to claim 1, wherein the multi-mode light waveguide (3) has an increased number of carried modes, as the result of an increase in the size of the fiber parameter V, in the case of index of refraction profiles having dissimilar shapes.

20. Method according to claim 1, wherein the method utilizes every mode of the multi-mode light waveguide (3) that is capable of propagation, between transmitter station (7) and receiver station (6), for transmission of a separate signal (TX) or channel, if applicable combined with polarization multiplex operation.

21. Device for transmission of optical data between a transmitter station (7) and a receiver station (6), by way of a multi-mode light waveguide (3), using a wavelength multiplex method, particularly for implementing the method according to claim 1,
wherein
the device has a transmitter station (7) having multiple optical transmitters (OS) for each of the wavelengths to be transmitted, which transmitters each produce a signal (TX) and apply these signals (TX) to the multi-mode light waveguide (3) by way of mode multiplexers (MM) and wavelength multiplexers (WM), wherein the multi-mode light waveguide (3) has a separate mode capable of propagation within the multi-mode light waveguide (3) for each of the modes to be transmitted,
the device has a receiver station (6) having multiple optical receivers (OE) that split the transmitted signals (RX) up into groups of signals having the same wavelength, by way of wavelength demultiplexers (WD), and into signals having the same mode, by way of mode demultiplexers (MD).

22. Device according to claim 21, wherein the transmitter station (7) has a mode multiplexer (MM), in each instance, for multiplexing the signals (TX) for each of the wavelengths or wavelength channels to be transmitted, and a common wavelength multiplexer (WM) that processes the output signals (TX') of the mode multiplexers (MM).

23. Device according to claim 21, wherein the transmitter station (7) has a wavelength multiplexer (WM) for multiplexing the signals (TX) for each of the wavelengths or wavelength channels, in each instance, and a common mode multiplexer (MM) that processes the output signals (TX') of the wavelength multiplexers (WM).

24. Device according to claim 21, wherein the receiver station (6) has a common wavelength demultiplexer (WD) for demultiplexing the signals (RX) for all the transmitted wavelengths or wavelength channels, and a number of mode demultiplexers (MD) that process the output signals (RX') of the wavelength demultiplexer (WD).

25. Device according to claim 21, wherein the receiver station (6) has a common mode demultiplexer (MD) for demultiplexing the signals (RX) for all the transmitted wavelengths or wavelength channels, and a number of wavelength demultiplexers (WD) that process the output signals (RX') of the mode demultiplexer (MD).

26. Device according to claim 21, wherein the mode multiplexer (MM) has a number of gradient lenses ($GL_{ein}$) on the input side that corresponds to the number of signal channels to be transmitted, which lenses convert the field distribution of the signals (TX) in the basic mode of single-mode light waveguides (1) into parallel beams, and wherein mode converters (MK) follow the gradient lenses ($GL_{ein}$), which convert the field distribution of the signals (TX) in such a manner that each signal, after they are brought together in semi-transparent mirrors (TS) and focused using a subsequent gradient lens ($GL_{aus}$), excites precisely one mode of the multi-mode light waveguide (2) disposed on the output side of the mode multiplexer (MM).

27. Device according to claim 26, wherein holograms or suitable spatial filters are present in the mode converters (MK), with which transformation of the field distribution takes place.

28. Device according to claim 21, wherein the mode multiplexer (MM) has a gradient lens ($GL_{ein}$) on the input side that transforms the output signal of the multi-mode waveguide (3) into a parallel beam, wherein semi-transparent mirrors (TS) follow the gradient lens ($GL_{ein}$), which multiply the parallel beam and pass it to mode converters (MK) that undertake transformation of the field distribution of the desired mode into a field distribution that excites the basic mode of the single-mode light waveguide (4) on the output side after focusing in a subsequent gradient lens ($GL_{aus}$).

29. Device according to claim 28, wherein the mode converters (MK) are configured in such a manner that they maintain the orthogonality of the field distributions.

30. Device according to claim 28, wherein the mode demultiplexer (MD) couples each mode of the multi-mode light waveguide (3) on the input side into precisely one single-mode light waveguide (4) on the output side, in each instance.

31. Device according to claim 28, wherein the mode demultiplexer (MD) is followed by a cross-mode interference canceller (XMIC), which undertakes separation of the interference components that occurred along the transmission segment (3), by means of mode coupling.

32. Device according to claim 31, wherein the cross-mode interference canceller (XMIC) uncouples part of the signal per input, multiplies it by a coefficient that influences the amount and the phase of the signal, and passes it to another output.

33. Device according to claim 28, wherein an electrical module follows the mode demultiplexer (MD), which removes the interference components from the demultiplexed signals after conversion to the electrical plane, wherein the output signals of the mode demultiplexer (MD) are coherently detected using superimposition receivers, and subsequently converted to digital signals.

34. Device according to claim 33, wherein means for digital signal processing are provided in the electrical module, which means perform cancellation of the interference components in accordance with the principle of the cross-mode interference canceller.

35. Device according to claim 28, wherein the mode demultiplexer (MD) performs superimposition of the signal of the local oscillator (LO) with the signal to be detected.

36. Device according to claim 35, wherein a gradient lens ($GL_{LO}$) is provided, which converts the output signal of the local oscillator (LO) into a parallel beam and brings it together with the signal to be detected in a semi-transparent mirror (TS), wherein subsequently, coupling the two signals into a single-mode light waveguide (4) takes place using a gradient lens ($GL_{aus}$).

37. Device according to claim 36, wherein the device implements phase diversity and/or polarization diversity.

38. Device according to claim 35, wherein the signal of the local oscillator (LO) can be passed in perpendicular to the plane of the beam guidance of the other signals in the mode demultiplexer (MD).

39. Device according to claim 35, wherein the signal of the local oscillator (LO) is divided up using semi-transparent mirrors (TS) and passed to multiple gradient lenses ($GL_{LO}$).

40. Device according to claim 21, wherein a waveguide arrangement for coherent detection is disposed behind the output (MM-LWL) of the multi-mode light waveguide (3), having a coupling zone (KZ), which arrangement makes a transition into a number of single-mode light waveguides (SM-LWL).

41. Device according to claim 40, wherein the number of outgoing single-mode light waveguides (SM-LWL) is selected in such a manner that at least one single-mode light waveguide (SM-LWL) is provided per mode carried in the multi-mode light waveguide (MM-LWL).

42. Device according to claim 40, wherein an electrical circuit is provided, which performs separation of the signals after coherent detection, preferably using a cross-mode interference canceller (XMIC).

43. Device according to claim 40, wherein a free-beam arrangement having lenses or other imaging elements such as curved mirrors or holograms is provided in the coupling zone (KZ).

* * * * *

UNITED STATES PATENT AND TRADEMARK OFFICE
CERTIFICATE OF CORRECTION

PATENT NO. : 8,582,932 B2 Page 1 of 1
APPLICATION NO. : 13/377744
DATED : November 12, 2013
INVENTOR(S) : Peter Krummrich It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 122 days.

Signed and Sealed this

Twenty-second Day of September, 2015

Michelle K. Lee
*Director of the United States Patent and Trademark Office*